United States Patent
Turley et al.

[11] Patent Number: 5,769,981
[45] Date of Patent: Jun. 23, 1998

[54] PNEUMATIC TIRE WITH BEAD REGIONS HAVING CIRCUMFERENTIALLY EXTENDING RIBS

[75] Inventors: John Anthony Turley, Sutton Coldfield; Arthur Roger Williams, Solihull, both of England

[73] Assignee: Sumitomo Rubber Industries, Ltd., Hyogo-ken, Japan

[21] Appl. No.: 745,621

[22] Filed: Nov. 8, 1996

[30] Foreign Application Priority Data

Nov. 14, 1995 [GB] United Kingdom .................. 9523275
Sep. 24, 1996 [GB] United Kingdom .................. 9619870

[51] Int. Cl.⁶ .......................... B60C 15/02; B60C 15/024
[52] U.S. Cl. .......................................... 152/544; 152/539
[58] Field of Search ..................................... 152/544, 539

[56] References Cited

U.S. PATENT DOCUMENTS

| | | | |
|---|---|---|---|
| 1,462,517 | 7/1923 | Marquette | 152/544 X |
| 2,484,620 | 10/1949 | Glen | 152/544 X |
| 2,587,470 | 2/1952 | Herzegh | 152/544 X |
| 2,698,042 | 12/1954 | Perkins | 152/544 X |

FOREIGN PATENT DOCUMENTS

| | | | |
|---|---|---|---|
| 122731 | 11/1946 | Australia | 152/544 |
| 646996 | 8/1962 | Canada | 152/539 |
| 1015316 | 9/1952 | France | 152/544 |
| 1167787 | 11/1958 | France | 152/544 |
| 1168154 | 12/1958 | France | 152/544 |
| 938767 | 2/1956 | Germany . | |
| 62-299411 | 12/1987 | Japan | 152/544 |
| 2-241808 | 9/1990 | Japan | 152/544 |
| 7-69010 | 3/1995 | Japan | 152/544 |
| 295878 | 3/1954 | Switzerland . | |

*Primary Examiner*—Adrienne C. Johnstone

[57] ABSTRACT

A radial tire having bead regions each comprising a bead clinch and a bead seat has between two and ten circumferentially extending ribs projecting outward of the bead region outer surface. The ribs are preferably continuous around the circumference of the tire bead and project outward from the bead region outer surface by a distance not greater than 8%, more preferably not greater than 3%, of the bead base width. Also the ribs preferably have a maximum width of between 5% and 15%, most preferably 10%, of the bead base width. The rib surface most preferably comprises a continuous surface of an arc and straight portion meeting tangentially.

15 Claims, 3 Drawing Sheets

PNEUMATIC TIRE WITH BEAD REGIONS HAVING CIRCUMFERENTIALLY EXTENDING RIBS

This invention relates to a pneumatic tire of the type having a radial construction.

BACKGROUND OF THE INVENTION

Advances in the design of vehicle suspensions have produced improvements in vehicle ride comfort which necessitate ever better uniformity in the tires, particularly in relation to Radial Run-Out (RRO), Lateral Run Out (LRO) and Radial Force Variation (RFV) of the tire.

The reasons for these uniformity variations in tires are complex but result basically from the tire construction and fabrication methods. Most tire components are made in long continuous lengths in which cross-sectional variations may be minimized. However, in the tire building process these are cut into discrete lengths and jointed to form the uncured toroidal tire carcass.

Such joints may be overlap joints or butt joints. Fabric reinforced components are normally overlapped at the joint whereas steel reinforced components are usually butted. Non-reinforced rubber components such as the tread, sidewall and clinch components are usually butted with an overlapping scarf joint. Thus, component joints may have an excess of material or, in the case of rubber components, a scarcity of material dependent on the tolerance of the cut length.

Studies by the inventors have shown that the seating pressure between the tire and wheelrim is directly related to tire non-uniformity manifest as variations in radial and lateral forces, such as may be produced by joints in major component, such as tread or breaker ply strips. Additionally, component joints in the bead regions themselves may cause variation in the proper seating of the bead on the wheelrim to the further detriment of uniformity.

SUMMARY OF THE INVENTION

Accordingly, it is an object of the present invention to provide a tire having improved uniformity when mounted on a wheelrim.

According to one aspect of the present invention, a radial tire comprises a tire carcass including a strip of circumferentially extending material jointed at the ends and having reinforcing cords extending radially between two bead regions and enclosed therein by wrapping around a circumferentially extending inextensible bead core, the axially outer surface of each bead region including a bead seat radially inward of the bead core for seating onto the rim seat of a wheelrim and terminating at a bead toe at the axial inward end of the bead seat, a bead clinch extending substantially radially outwardly and located axially outwardly of the bead core and bead heel extending between the radially inward end of the bead clinch and the axially outward end of the bead seat, the bead regions having a bead base width being the axial distance between the bead toe and the bead heel point characterized in that each bead region has between two and ten circumferentially extending ribs projecting outward of the outer surface.

Preferably, the ribs are continuous around the circumference of the tire bead. The ribs preferably project outward from the bead region outer surface by a distance which is not greater than 8%, or more preferably 3%, of the bead base width.

Also, preferably, the ribs have a maximum width of between 5 and 15%, or most preferably 10%, of the bead base width.

The ribs may have their maximum width across the base and may have their maximum projecting distance at a single point on the rib surface lying nearest the edge of the rib nearest the bead toe.

Most preferably, the rib surface comprises a continuous surface of an arc and straight portion meeting tangentially.

The tire may have ribs on the bead base and may have ribs on the bead heel.

BRIEF DESCRIPTION OF THE DRAWINGS

Further aspects of the invention will become apparent from the following description, by way of example only, of one embodiment in conjunction with the following drawings in which.

DETAILED DESCRIPTION OF THE INVENTION

Figure 1:
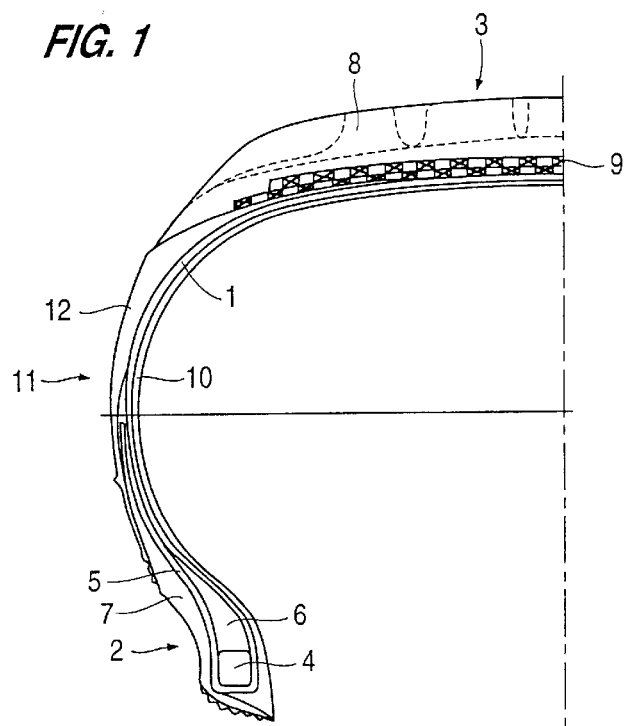
FIG. 1 shows a schematic diagram of a cross-section of one half of a radial tire for a passenger vehicle according to the invention.

FIG. 1 shows the construction of a 165R13 size passenger vehicle tire according to the present invention.

The tire construction comprises a single reinforcing ply 1 extending through a tread region 3 to bead regions 2 wherein it is anchored by being turned up around an inextensible bead core 4 from the axially inside to the outside to form ply turn-ups 5. In each bead region 2, a tapering hard rubber apex 6 is disposed radially outward of the bead core 4 and between the ply 1 and the ply turn-up 5 to stiffen the bead region 2. On the axially outer side of the ply turn-up 5 is disposed a rubber clinch strip 7 to prevent chafing against the flange of the wheel rim.

The ground contacting tread region 3 of the tire has a patterned rubber tread 8 and a reinforcing breaker 9 disposed radially inward to the tread 8 and outward of the ply 1. On the inside of the tire is an innerlining 10 comprising a rubber of high impermeability to air and moisture for the purpose of retaining the inflation air.

Between the tread region 3 and the bead regions 2, the ply 1 passes through sidewall regions 11 and is protected by a sidewall rubber 12.

With the exception of the bead core 4, all of the above-mentioned components of the tire are normally prepared in continuous lengths, but to the required circumferential length and assembled in a particular order by wrapping around a former and bringing the two cut ends together to form a joint of one of the above-mentioned types.

Figure 2:
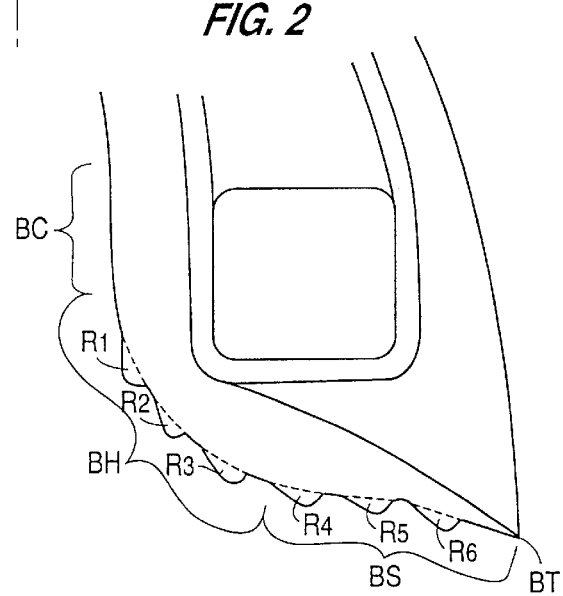
FIG. 2 is a schematic diagram of the bead region of the tire of FIG. 1.
Figure 3:
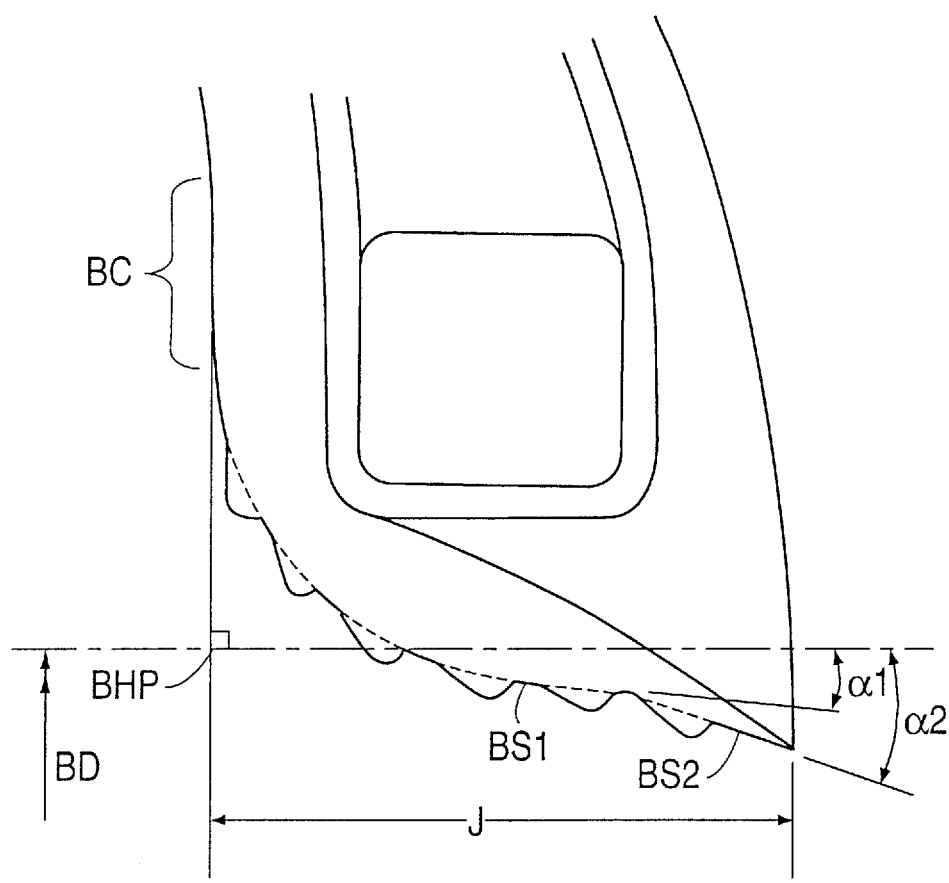
FIG. 3 is a schematic cross-sectional diagram of the bead region of the tire of FIG. 1 showing the constructions of the theoretical bead heel point.
Figure 4:
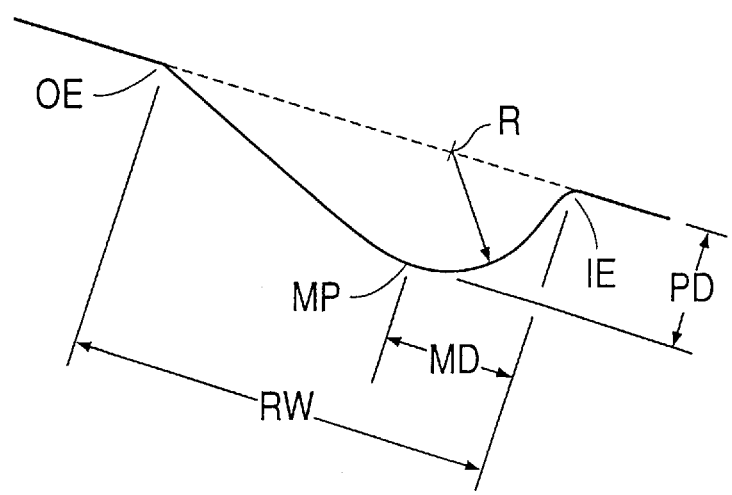
FIG. 4 is a schematic cross-sectional diagram of a rib of the bead region of the tire of FIGS. 1–3.

FIGS. 2 and 3 show detail of the bead region 2 of the tire of FIG. 1. Thus, the outside of the bead region 2 comprises a double tapered bead seat BS, for seating on a wheelrim, lying radially inside the bead core 4, a bead clinch BC lying axially outward of the bead core and extending substantially radially outwardly and between the bead seat BS and bead clinch BC a curved bead heel BH. The double tapered bead seat BS comprises an axially outer first taper portion BS1 inclined at a relatively small angle $\alpha_1$ to the tire axial direction and an axially inner second taper portion BS2 inclined at a larger angle $\alpha_2$.

The bead region has a bead base width (or J dimension) of 14 mm being the axial distance between the bead toe BT at the axially inner end of the bead seat BS and the theoretical bead heel point BHP, which is a notional point on the designated diameter BD vertically below the vertical portion of the tire bead clinch BC or vertically below the point of inflexion of the bead clinch BC.

The bead region 2 has six ribs R1–R6 projecting from the outer surface of the bead and extending circumferentially around the entire circumference of the tire. In this embodiment, three ribs R1–R3 are provided on the bead heel BH and three ribs R4–R6 are provided on the bead seat BS.

As shown in FIG. 3, each rib has a maximum width RW measured along the bead surface between the axially outer and inner base edges OE and IE, respectively, of 1.4 mm.

The outer surface of the rib between the base edges OE and IE is a single surface without base edges having a contour defined by a circular arc of radius 0.4 mm and a straight line meeting tangentially. Accordingly, the rib has a maximum projecting distance PD of 0.4 mm at a single point MP which is nearest to the axially inner base IE, that is the distance MD of the point MP of the maximum projecting distance PD from the axially inner base edge IE is less than half of the rib width RW. In this embodiment, the six ribs R1–R6 are equally spaced apart along the bead outer surface.

In order to illustrate the invention, a batch of twenty experimental tires in accordance with the invention and a batch of twenty standard tires for comparison were prepared. For this, initially a batch of forty green tire cases were assembled by the same operator using the same building machine and tire components from the same batch. Twenty of these uncured cases were molded in a 165R13 size mold in which the mold bead rings had been modified to have six grooves having position and shape complementary to the six ribs R1–R6 shown in FIG. 2. The remaining twenty uncured cases were molded consecutively in the same mold in which the modified bead rings had been replaced by standard bead rings having a single circumferentially continuous groove of 0.4 mm radius and 0.3 mm depth located in the bead heel region to provide conventional line venting of the tire bead.

The experimental and standard tires were tested for uniformity by mounting the tire on a 'true' wheelrim of a scheduled size having negligible run-out and inflating the tire to its schedule pressure, then measuring the properties of Lateral Force Variation (LFV), and Radial Run Out (RRO) of the unit. The results of these tests are given in Table 1 which shows the averages of twenty tires. Thus, Table 1 shows the composite value which is the peak to peak difference between the maximum and minimum value of the property being measured during one revolution of the tire and the first harmonic value which is the peak to peak amplitude of the sine wave representing that measurement for one revolution of the tire. The Lateral Force Variation (LFV) tests were performed in both forward and reverse rotation direction.

TABLE 1

| Uniformity | Experimental Tire | | Standard Tire | |
| --- | --- | --- | --- | --- |
| Test | Composite | First Harmonic | Composite | First Harmonic |
| LFV Forward (N) | 45.80 | 35.95 | 62.50 | 51.45 |
| Reverse | 74.60 | 59.80 | 80.60 | 70.15 |
| RFV Forward (N) | 62.45 | 32.15 | 70.05 | 45.6 |
| RRO (mm) | 0.753 | 0.3 | 0.91 | 0.4 |

Accordingly, it can be seen that in every test the experimental tires recorded a lower value indicating better uniformity than the standard tire. Overall the experimental tires exhibited significant levels of 17%, 25% and 20% improvements in Lateral Force Variation (LFV), Radial Force Variation (RFV) and Radial Run Out (RRO), respectively.

Figure 5:
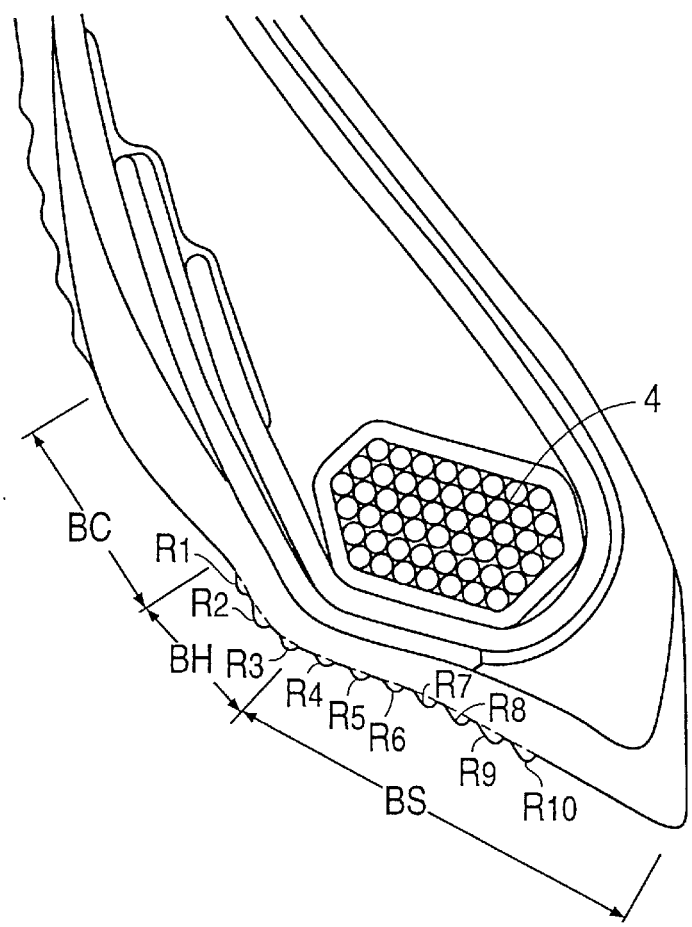
FIG. 5 is a schematic cross-sectional diagram of the bead region of a truck tire.

Shown in FIG. 5, the outside of the bead region 2 of a truck tire comprises a double tapered bead seat BS, for seating on a wheelrim, lying radially inside the bead core 4, a bead clinch BC lying axially outward of the bead core and extending substantially radially outwardly and between the bead seat BS and bead clinch BC, a curved bead heel BH.

The bead region 2 is provided with ten ribs R1–R10 projecting from the outer surface of the bead and extending circumferentially around the entire circumference of the tire. In this embodiment, three ribs R1–R3 are provided on the bead heel BH and seven ribs R4–R10 are provided on the bead seat BS.

The shape, dimensions and positioning of these ribs R1–R10 are in accordance with the preferred dimensions set forth above.

Figure 6:
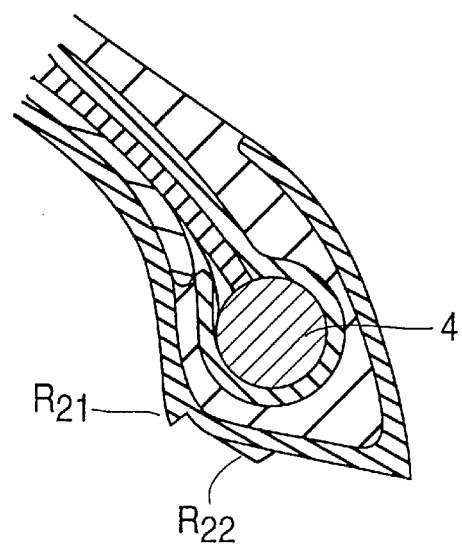
FIG. 6 is a cross-sectional diagram of a motorcycle tire bead region.

FIG. 6 shows the bead of a motorcycle tire having two such circumferentially extending ribs R21 and R22, provided one each in the bead heel and bead seat regions, respectively.

Tires having the beads illustrated in FIGS. 5 and 6 have been extensively tested in comparison to similar conventional tires and have shown improved levels of uniformity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described our invention what we claim is:
1. A radial tire comprising a tire carcass comprising a strip of circumferentially extending material jointed at the ends and including reinforcing cords extending between two bead regions and enclosed therein by wrapping around a circumferentially extending inextensible bead core in each bead region, the axially outer surface of each bead region comprising a bead seat radially inward of the bead core for seating onto the rim seat of a wheelrim, the bead seat terminating at a bead toe at the axially inward end of the bead seat, and a bead clinch extending substantially radially outwardly and located axially outwardly of the bead core and a bead heel extending between the radially inward end of the bead clinch and the axially outward end of the bead seat, the bead regions having a bead base width being the axial distance between the bead toe and the theoretical bead heel point, wherein each bead region has between two and ten circumferentially extending ribs projecting outward of the bead region outer surface, each rib surface lying between the edges of the base of the rib where the rib contacts the outer surface of the bead region being one continuous surface having no edges, the rib surface in cross section comprising an arc and a straight line meeting tangentially.

2. The tire according to claim 1, wherein the ribs extend continuously around the circumference of the tire bead.

3. The tire according to claim 1, wherein the ribs project outwardly from the bead region outer surface by a projecting distance which is not greater than 8% of the bead base width.

4. The tire according to claim 1, wherein the ribs project outward from the bead region outer surface by a projecting distance which is not greater than 3% of the bead base width.

5. The tire according to claim 1, wherein the ribs have a maximum cross-sectional width which is in the range of 5–15% of the bead base width.

6. The tire according to claim 1, wherein the ribs have a maximum cross-sectional width which is 10% of the bead base width.

7. The tire according to claim 1, wherein the maximum cross-sectional width of the rib is across the base of the ribs where the rib contacts the outer surface of the bead region.

8. The tire according to claim 1, wherein the maximum projecting distance of the ribs is located at a single point on the rib cross-section.

9. The tire according to claim 8, wherein the single point of maximum projecting distance of each rib lies nearer to an axially inner edge of the base of the rib where the rib contacts the outer surface of the bead region than the axially outer base edge thereof.

10. The tire according to claim 1, wherein each bead region has six ribs.

11. The tire according to claim 1, wherein three ribs are provided on each said bead seat.

12. The tire according to claim 11, wherein the three ribs are equally spaced apart on the bead seat.

13. The tire according to claim 1, wherein the tire has three ribs provided on each said bead heel.

14. The tire according to claim 13, wherein the three ribs are equally spaced apart on the bead heel.

15. The tire according to claim 1, wherein the ribs are equally spaced apart on the bead region outer surface.

* * * * *